June 11, 1957 J. C. G. CARTER 2,795,649
TRANSMITTER CONTROL CIRCUIT
Filed July 20, 1953
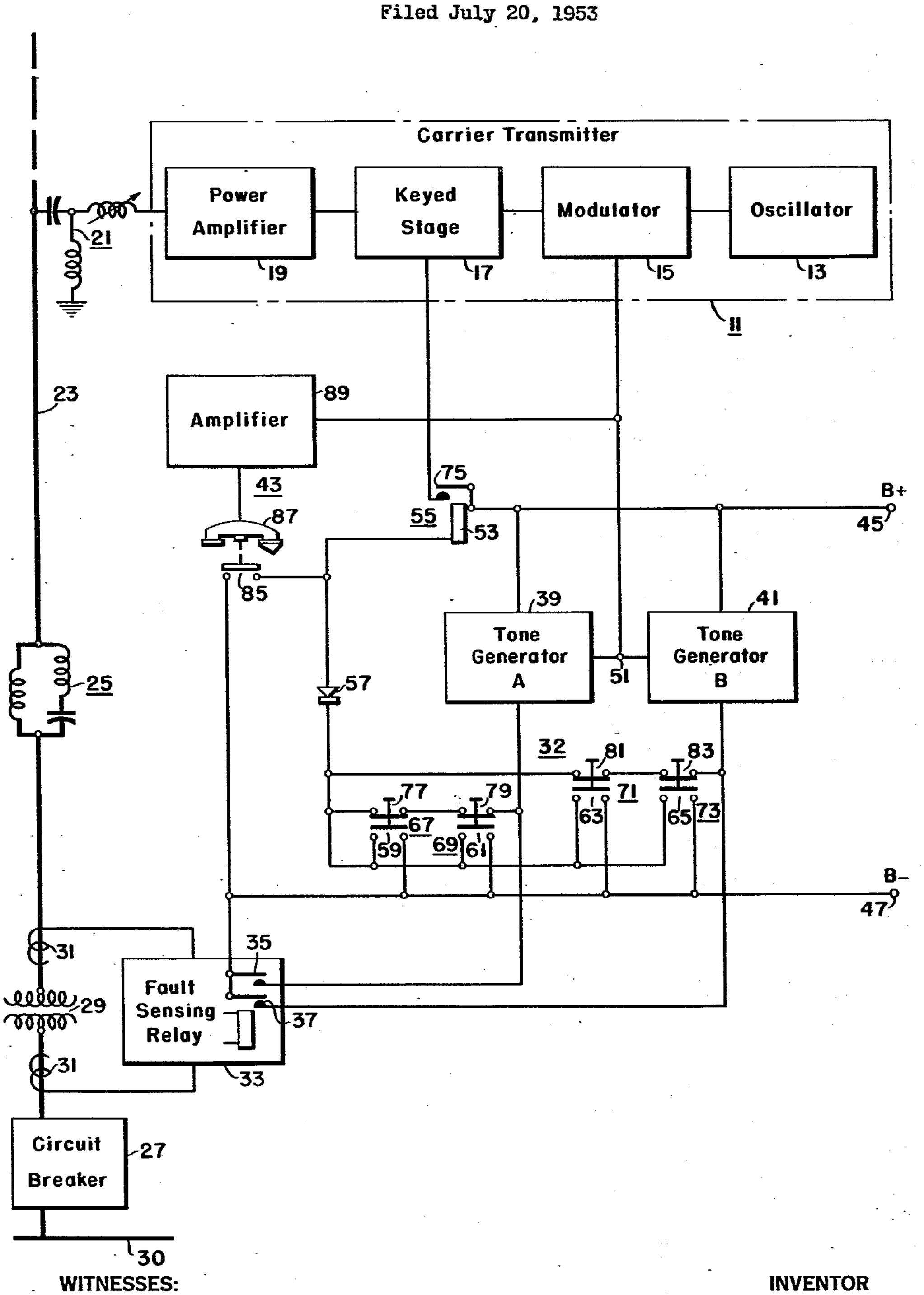
WITNESSES:
John E. Healy
Wm. T. Wofford
INVENTOR
John C. G. Carter.
BY F. E. Browder
ATTORNEY

United States Patent Office 2,795,649
Patented June 11, 1957

2,795,649

TRANSMITTER CONTROL CIRCUIT

John C. G. Carter, Baltimore, Md., assignor to Westinghouse Electric Corporation, East Pittsburgh, Pa., a corporation of Pennsylvania Application July 20, 1953, Serial No. 368,941

7 Claims. (Cl. 179—2.5)

My invention relates to transmitter control circuits, and is particularly applicable to control of transmitters in power line carrier apparatus.

It is often desirable in power line carrier communications systems to use a single carrier channel for multiple functions, none of which require continuous carrier transmission. Typical of such functions are protective relaying, voice communications, supervisory control, telemetering, and sleet measuring. An essential requirement in these systems is that the starting of the carrier transmitter by a particular function shall not affect any other function, and that the protective relaying function shall take precedence over all other functions. There is a need for a control circuit which will fulfill this requirement and yet be less complex and more reliable than those of the prior art.

It is accordingly an object of my invention to provide a simple and reliable control circuit which will allow starting of a carrier transmitter by a particular function without affecting any other function, and in which the protective relaying function takes precedence over all other functions.

These and other objects and effected by my invention as will be apparent from the following description taken in accordance with the accompanying drawing, forming a part of this application, in which the single figure is a schematic circuit diagram showing a preferred embodiment of my invention.

In the drawing there is shown a carrier transmitter 11 comprising oscillator 13, modulator 15, keyed 17, and power amplifier 19 stages. Since the carrier transmitter may be of a conventional type well known in the art, it is shown in block form. The power amplifier 19 is coupled by means of a conventional line tuner 21 to one conductor 23 of a commercial high tension power distribution system. A conventional line trap 25 may be connected by the power line conductor between the line tuner and one winding of a line section power transformer 29. The other winding of the transformer is connected to a station bus 30 through circuit breaker 27. The sensing elements 31 of a conventional fault sensing relay 33 are connected in inductive relation to the power line conductor 23 on opposite sides of the line section transformer 29. The fault sensing relay 33 has two pairs of normally open contacts 35, 37 which close simultaneously when a fault appears. A control circuit 32 interconnects the transmitter 11, the fault sensing relay 33, a pair of tone generators 39, 41, and an auxiliary function device 43. The control circuit 32 is energized from the positive and negative terminals 45, 47 of a direct current power supply (not shown). The energizing terminals of the tone generators 39, 41 are connected on one side to the positive power supply terminal 45 and on the other side through respective contacts 35, 37 of the fault sensing relay 33 to the negative power supply terminal 47. The output terminal 51 of the tone generators 39, 41 is connected to the transmitter modulator 15. The energizing winding 53 of a transmitter keying relay 55 is connected on one side to the positive power supply terminal 45 and on the other side through a rectifier 57 and the parallelled make contacts 59, 61, 63, 65 of four pushbutton switches 67, 69, 71, 73 to the negative power supply terminal 47. The rectifier 57 is poled to conduct in the direction from the positive power supply terminal 45 to the negative power supply terminal 47. A normally open contact 75 of the keying relay 55 is connected on one side to the transmitter keyed stage 17 and on the other side to the power supply positive terminal 45. The break contacts 77, 79 of the first and second pushbutton switches 67, 69 are connected in series between the negative side of the rectifier 57 and the keying circuit of tone generator A. The break contacts 81, 83 of the third and fourth pushbutton switches 71, 73 are connected in series between the negative side of the rectifier 57 and the keying circuit of tone generator B. The normally open contacts 85 of an auxiliary function switch are connected between the positive side of the rectifier 57 and the negative power supply terminal 47. The single auxiliary function shown is that of voice communication. The output of a telephone handset 87 is connected through an amplifier 89 to the modulator stage 15 of the carrier transmitter 11. The auxiliary function switch is actually a push-to-talk switch on the telephone handset 87, and is closed when the handset is to be used for speech transmission.

The control circuit connections are such that the transmitter carrier will be started either when an auxiliary function is initiated, when the fault sensing relay is energized, or when any one of the four pushbuttons is actuated. The starting of an auxiliary function will have no effect on either the fault sensing relay or the tone generators, and the starting of a single tone generator for test purposes by actuating a single pushbutton will have no effect on either the auxiliary functions or the fault sensing relay, or the other tone generator. The first and third pushbuttons 67, 71 are for local control, and the second 69 and fourth 73 are for control from a remote point. Only one tone generator can be applied at any one time by operation of the pushbuttons regardless of any combination of pushbutton actuations. When the fault sensing relay 33 is energized, it will start both tone generators 39, 41 and the carrier transmitter by means of relay 55, regardless of whether any, or all, or any combination of pushbuttons are actuated, and whether any auxiliary functions are in use or not. For example, if the first pushbutton 67 is depressed, a circuit will be completed from the positive power supply terminal 45 through the second tone generator 41, the break contacts 81, 83 of the third and fourth pushbuttons 71, 73, and the make contact 59 of the first pushbutton 67 to the negative power supply terminal 47. Thus, depressing the first pushbutton 67 will start the second tone generator 41. If the fault sensing relay 33 is energized while the first pushbutton 59 is depressed, both tone generators 39, 41 will be energized by the circuit through the fault sensing relay contacts 35, 37 to the negative power supply terminal 47, which circuit bypasses the pushbuttons. If it is desired to use an auxiliary function while any one of the pushbuttons is depressed, the auxiliary function contacts 85 will be closed, completing a circuit from the positive power supply terminal 45 through the keying relay energizing winding 53 and the auxiliary function contacts 85 to the negative power supply terminal 47. Thus it is apparent that the fault sensing relay will take precedence over either an auxiliary function or any combination of pushbuttons, and that an auxiliary function will take precedence over any combination of pushbuttons. It is also apparent that only a single tone generator may be energized at any one time by operating any combination of pushbuttons. It may further be said that operation of the pushbuttons or the fault sensing contacts will start the transmitter by means of relay 53. This is necessary so that the tones will be transmitted over the carrier channel. It is also necessary to start the transmitter for the auxiliary function, but not to start the tones on such occasions. This is accomplished by means of the rectifier 57, which allows the handset pushbutton to energize relay 53 by completing the circuit through its energizing coil, but prevents completion of the tone keying circuits, which would start the tones. However, if while the auxiliary function is keying the transmitter, the fault sensing relay operates, it will then complete the tone generator keying circuits, starting the tones and applying them to the carrier which is already started.

While I have shown only a single auxiliary function, it will be understood that other auxiliary functions such as supervisory control, telemetering, and etc. may be added by simply adding a normally open contact in parallel with the voice communication contact for each auxiliary function to be added. It is further apparent that the fault sensing relay connection shown is for illustrative purposes only, and that other well known fault sensing arrangements would be equally applicable.

While I have shown my invention in only one form, it will be apparent to those skilled in the art that it is not so limited, but is susceptible of various changes and modifications without departing from the spirit thereof.

I claim as my invention:

1. Apparatus for controlling the operation of a transmitter having a keyed stage and including a keying relay for said stage; said relay having an energizing coil; first and second voltage supply terminals for said apparatus; first and second tone generators for said transmitter; a fault sensing relay including two pairs of normally open contacts; a first circuit path extending from said first terminal through said first tone generator and a first pair of said normally open contacts of said fault sensing relay to said second terminal; a plurality of switches for controlling said generators; said switches having normally closed front contacts and normally open back contacts; a second circuit path extending from said first terminal through said first tone generator, the normally closed front contacts of a first of said switches, and the normally open back contacts of a second of said switches to said second terminal; a third circuit path extending from said first terminal through said second tone generator and a second pair of said normally open contacts of said fault sensing relay to said second terminal; a fourth circuit path extending from said first terminal through said second tone generator, the normally closed front contacts of said second switch and the normally open back contacts of said first switch to said second terminal; a rectifier and a third switch having normally open contacts, a fifth circuit path extending from said first terminal through the energizing coil of said keying relay, said rectifier, and the normally open back contacts of said first and second switches to said second terminal; said rectifier being poled to conduct in the direction from said first to said second terminal; and a sixth circuit path extending from said first terminal, said keying relay energizing coil, and the normally open contacts of said third switch to said second terminal.

2. Apparatus for controlling the operation of a transmitter having a keyed stage and including a keying relay having an energizing coil, first and second voltage supply terminals for said apparatus, first and second tone generators for said transmitters, a plurality of switches for controlling said generators, each of said switches having normally open back contacts and normally closed front contacts, a fault sensing relay having two pairs of normally open contacts, each of said generators having one terminal connected to said first terminal and another terminal connected through a pair of normally open contacts of said fault sensing relay to said second terminal and through the normally closed front contacts of one of said switches and the normally open back contacts of another of said switches to said second terminal, and a circuit path from said first terminal through said energizing coil and the normally open back contacts of said other switch to said second terminal.

3. Apparatus for controlling the operation of a transmitter having a keyed stage and including a keying relay having an energizing coil, first and second voltage supply terminals for said apparatus, first and second tone generators for said transmitter, a fault sensing relay having normally open contacts, each of said generators having one terminal connected to said first terminal and another terminal connected through said contacts to said second terminal, a plurality of pushbutton switches for controlling said tone generators said switches having front and back contacts, circuit paths leading from said other terminal of each generator through the front contacts of one pushbutton switch and the back contacts of another pushbutton switch to said second terminal, a circuit path from said first terminal through said energizing coil and the back contacts of at least one of said pushbutton switches to said second terminal, means for permitting said transmitter to perform another function other than a keying function, a relay for actuating said means, and a circuit path from said first terminal through said energizing coil and said actuating relay to said second terminal.

4. Apparatus including a keying relay having an energizing coil; first and second voltage supply terminals for said apparatus; first and second tone generators; a fault sensing relay having a plurality of normally open pairs of contacts; each of said generators having one terminal connected to said first terminal and another terminal connected through one of said pairs of normally open relay contacts to said second terminal; a plurality of switches having normally closed front contacts and normally open back contacts; said other terminal of each generator being connected through the normally closed front contacts of one of said switches and the normally open back contacts of another of said switches to said second terminal; a rectifier; and a circuit path from said first terminal through said energizing coil, said rectifier, and normally open back contacts of said other switch to said second terminal; said rectifier being poled to conduct in the direction from said first terminal to said second terminal.

5. In a communication system, a normally inoperative transmitter having means for generating carrier energy, first and second tone generators, first means actuable to cause modulation of said carrier energy with the output of said first tone generator, second means actuable to cause modulation of said carrier energy with the output of said second tone generator, third means actuable to cause modulation of said carrier energy with the outputs of both the first and second tone generators, fourth means actuable to permit modulation of said carrier energy with audio signals alone, a device for rendering said transmitter operative whenever said carrier energy is modulated, said first and second means being such that actuation of the one will prevent actuation of the other to cause modulation of said carrier energy and vice versa, and said third means being such as to cause modulation of said carrier energy with the outputs of said first and second tone generators regardless of whether or not said first, second, or fourth means is actuated.

6. Apparatus in accordance with claim 5 wherein said first and second means each comprise a pair of parallel-connected switches having normally closed front contacts and normally open back contacts.

7. In a communication system, a normally inoperative transmitter having an oscillator and a modulator, first means for modulating the output of said oscillator with a signal having a characteristic tone, second means responsive to an off-normal condition in said communication system for modulating the output of said oscillator with a signal having another and different characteristic tone, third means actuable to modulate the output of said oscillator with audio signals, a device for rendering said transmitter operative whenever the output of said oscillator is modulated with one of the aforesaid signals, and means for rendering said first means ineffective while said second means is actuated to modulate the output of said oscillator with said other and different tone.

No references cited.